United States Patent
Yu

(10) Patent No.: US 9,885,891 B2
(45) Date of Patent: Feb. 6, 2018

(54) CLOTH ATTACHING DEVICE AND METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui Province (CN)

(72) Inventor: De Yu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui Province (CN)

( * ) Notice: Subject to any disclaimer, the term of this patent is extended or adjusted under 35 U.S.C. 154(b) by 189 days.

(21) Appl. No.: 14/573,285

(22) Filed: Dec. 17, 2014

(65) Prior Publication Data

US 2016/0046068 A1 Feb. 18, 2016

(30) Foreign Application Priority Data

Aug. 12, 2014 (CN) .......................... 2014 1 0395658

(51) Int. Cl.
*B29C 63/06* (2006.01)
*G02F 1/13* (2006.01)
(Continued)

(52) U.S. Cl.
CPC ........ *G02F 1/1303* (2013.01); *B29C 63/0047* (2013.01); *B29C 63/04* (2013.01); *B29C 63/06* (2013.01); *G02F 1/133784* (2013.01)

(58) Field of Classification Search
CPC ............. G02F 1/1303; G02F 1/133784; G02F 1/13378; B29C 63/06; B29C 63/0047; B29C 63/00; B29C 63/04
(Continued)

(56) References Cited

U.S. PATENT DOCUMENTS 3,555,140 A * 1/1971 Argereu ............. B29D 99/0035
264/255
2004/0241326 A1* 12/2004 Yu .............................. B08B 1/02
427/340
2007/0153181 A1 7/2007 Song et al.

FOREIGN PATENT DOCUMENTS

CN 1991522 A 7/2007
JP 06273766 A 9/1994
(Continued)

OTHER PUBLICATIONS

Machine translation of KR100349898, Aug. 2002.*
(Continued)

*Primary Examiner* — Philip Tucker
*Assistant Examiner* — Jimmy R Smith, Jr.
(74) *Attorney, Agent, or Firm* — Ladas & Parry LLP

(57) ABSTRACT

The present disclosure provides a cloth attaching device and a cloth attaching method. The cloth attaching device comprises: a cylindrical base, a rubbing roller opposing the cylindrical base and an actuating unit, an annular adhesive layer covering a cylindrical surface of the cylindrical base; a first connecting component holding both ends of the cylindrical base and connecting to the actuating unit; and a second connecting component holding both ends of the robbing roller and connecting to the actuating unit. The actuating unit is configured to control a movement of the first connecting component and the second connecting component so that the rubbing roller and the cylindrical base rotate in sync or not in sync. The present disclosure overcomes defects in which the rubber pad displaces very easily and the aging process is very time consuming, which facilitates to improve fabricating efficiency and quality of the rubbing roller.

12 Claims, 3 Drawing Sheets

(51) Int. Cl.
*B29C 63/00* (2006.01)
*B29C 63/04* (2006.01)
*G02F 1/1337* (2006.01)

(58) Field of Classification Search
USPC .............. 156/169, 172, 187, 215, 184, 185
See application file for complete search history.

(56) References Cited

FOREIGN PATENT DOCUMENTS

| | | | |
|---|---|---|---|
| JP | 1184383 A | | 3/1999 |
| JP | 1195222 A | | 4/1999 |
| JP | 11095222 A | * | 4/1999 |
| JP | 2934630 B2 | * | 8/1999 |
| KR | 100349898 B1 | * | 8/2002 |
| KR | 20100078253 A | * | 7/2010 |

OTHER PUBLICATIONS

Translated abstract of JP11095222, Apr. 1999.*
Translated abstract of KR20100078253, Jul. 2010.*
First Chinese Office Action dated Jun. 1, 2016; Appln. No. 201410395658.7.
Second Chinese Office Action dated Oct. 19, 2016; Appln. No. 20140395658.7.
Third Chinese Office Action dated Apr. 1, 2017; Appln. No. 201410395658.7.

* cited by examiner

CLOTH ATTACHING DEVICE AND METHOD THEREOF

FIELD

The present disclosure relates to the technical field of liquid crystal display device, particularly to a cloth attaching device and the method thereof.

BACKGROUND

In a cell assembling process of liquid crystal panel, rubbing process is referred to rub alignment films on an array substrate and a color film in a certain direction using nylon cloth, fiber or cotton fabric (collectively referred as "rubbing cloth" as below), so as to form grooves which enable the liquid crystal to be arranged at a pre-aligned angle. This process is referred as liquid crystal molecular alignment technology. The quality of the liquid crystal molecular alignment has a great effect on fundamental properties of liquid crystal display, such as uniformity, angle of view, chromatic aberration, response speed and threshold voltage. However, the quality of the liquid crystal molecular alignment is closely related to the quality of a rubbing roller. Therefore, it is significant to fabricate a high quality rubbing roller in the rubbing process.

In the existing fabricating process of a rubbing roller, the cloth attaching device generally has a flat base. When a cloth attaching is performed, a rubbing cloth is firstly spread on the flat base with a rubber pad separating the rubbing cloth and the flat base, then an adhesive is applied and a cloth is attached by controlling the movement of a raw material roller. The rubber pad is spread directly on the base made of metal without being fixed. In the process of the adhesive applying and cloth attaching by the rubbing roller, the rubber pad will be somewhat displaced due to the rubbing force and the stress, which results in defects such as air bubbles readily occurred in the process of the adhesive applying and cloth attaching by the rubbing roller.

Moreover, when the aging of the rubbing roller is performed using the above-mentioned cloth attaching device, in order to keep the fiber directions of the rubbing cloth consistent, the rubbing roller can only repeat a movement such as rolling from a first end to a second end on the flat base, raising, moving back to the first end in the air and dropping in a single direction. This makes the aging process time consuming and results in a low efficiency for fabricating the rubbing roller such that the manufacturing cost is in turn increased.

SUMMARY

The present disclosure provides a cloth attaching device and a cloth attaching method, which addresses the issues in which the rubber pad displaces very easily and the aging process is very time consuming, thus improving fabricating efficiency and quality of the rubbing roller.

In a first aspect, the present invention provides a cloth attaching device. A cloth attaching device comprises: a cylindrical base, a rubbing roller opposing the cylindrical base and an actuating unit, an annular adhesive layer covering a cylindrical surface of the cylindrical base; a first connecting component holding both ends of the cylindrical base and connecting to the actuating unit; and a second connecting component holding both ends of the rubbing roller and connecting to the actuating unit. The actuating unit is configured to control a movement of the first connecting component and the second connecting component so that the rubbing roller and the cylindrical base rotate in sync or not in sync.

Preferably, the cloth attaching device further comprises: a flat base for supporting a double-sided tape or a rubbing cloth. The flat base has a surface tangential to the cylindrical surface of the cylindrical base.

Preferably, the first connecting component comprises a clamp corresponding to a slot formed on an end surface of the cylindrical base.

Preferably, the cloth attaching device further comprises a position sensor for obtaining a position information of the first connecting component and the second connecting component.

Preferably, the position sensor is connected to the actuating unit for outputting a sensing signal including the position information to the actuating unit. The actuating unit is further configured to control the movement of the first connecting component and the second connecting component according to the input signal of the sensor.

Preferably, the annular adhesive layer has a length on the cylindrical surface of the cylindrical base greater than a length of the rubbing roller.

Preferably, the annular adhesive layer is made of soft rubber.

Preferably, the cylindrical base comprises a recess on the cylindrical surface and the annular adhesive layer is embedded within the recess.

In a second aspect, the present invention provides a cloth attaching method. The method comprises: spreading a rubbing cloth on a plane with one side of the rubbing cloth held between a cylindrical surface of a cylindrical base and a cylindrical surface of a rubbing roller, the cylindrical surface of the cylindrical base covered by an annular adhesive layer; controlling the cylindrical base and the rubbing roller to rotate reversely in sync or not in sync to attach the rubbing cloth on the cylindrical surface of the rubbing roller.

Preferably, before spreading the rubbing cloth on the plane, the method comprises: providing an adhesive layer for attaching the rubbing roller and the rubbing cloth provided on the cylindrical surface of the rubbing roller or a surface of the rubbing cloth.

Preferably, the adhesive layer is formed by a double-sided tape. Providing the adhesive layer for attaching the rubbing roller and the rubbing cloth on the cylindrical surface of the rubbing roller further comprises: removing a spacer layer on a first side of the double-sided tape; spreading the double-sided tape on a plane with the one end of the double-sided tape held between the cylindrical surface of the cylindrical base and the cylindrical surface of the rubbing roller, the first side of the double-sided tape facing the rubbing roller; controlling the cylindrical base and the rubbing roller to rotate reversely in sync or not in sync to attach the double-sided tape on the cylindrical surface of the rubbing roller; and removing a spacer layer on a second side of the double-sided tape.

Preferably, before removing the spacer layer on a second side of the double-sided tape, the method further comprises: moving the rubbing roller or the cylindrical base to press the cylindrical surface of the rubbing roller against the cylindrical surface of the cylindrical base; controlling the cylindrical base and the rubbing roller to rotate reversely in sync or not in sync to attach the double-sided tape on the cylindrical surface of the rubbing roller.

Preferably, after attaching the rubbing cloth on the cylindrical surface of the rubbing roller, the method further comprises: moving the rubbing roller or the cylindrical base to press the cylindrical surface of the rubbing roller against the cylindrical surface of the cylindrical base; controlling the cylindrical base and the rubbing roller to rotate reversely in sync or not in sync so that fibers of the rubbing cloth attached on the rubbing roller extend in a same direction.

It is known from the above-mentioned technical solutions that the present invention employs a cylindrical base to replace a conventional flat base. In this case, a rubber pad can be firmly fixed on the cylindrical base due to the elasticity of the rubber pad. Thus, the defect in which the rubber pad displaces very easily is overcome and the corresponding issue due to the defect is avoided, thus improving fabricating quality of the rubbing roller.

Moreover, with the cylindrical base, the rubbing roller and the cylindrical base can be rotated reversely in sync to perform the aging process, thus the rubbing roller does not need to move back and forth in the aging process, which is very time consuming. Therefore, the aging process is simplified and the fabricating efficiency is enhanced.

Indeed, it is unnecessary to simultaneously achieve all of the above-mentioned advantages in implementing any product or method of the present disclosure.

BRIEF DESCRIPTION OF THE DRAWINGS

In order to illustrate the technical solutions of the embodiments of the present disclosure or the prior art more clearly, the drawings for describing the embodiments or the prior art are briefly introduced as below. It is obvious that the drawings described as below are some embodiments of the present disclosure and other drawings can be obtained from these drawings without any inventive work for those skilled in the art,.

DETAILED DESCRIPTION OF THE PREFERRED EMBODIMENTS

Figure 1:
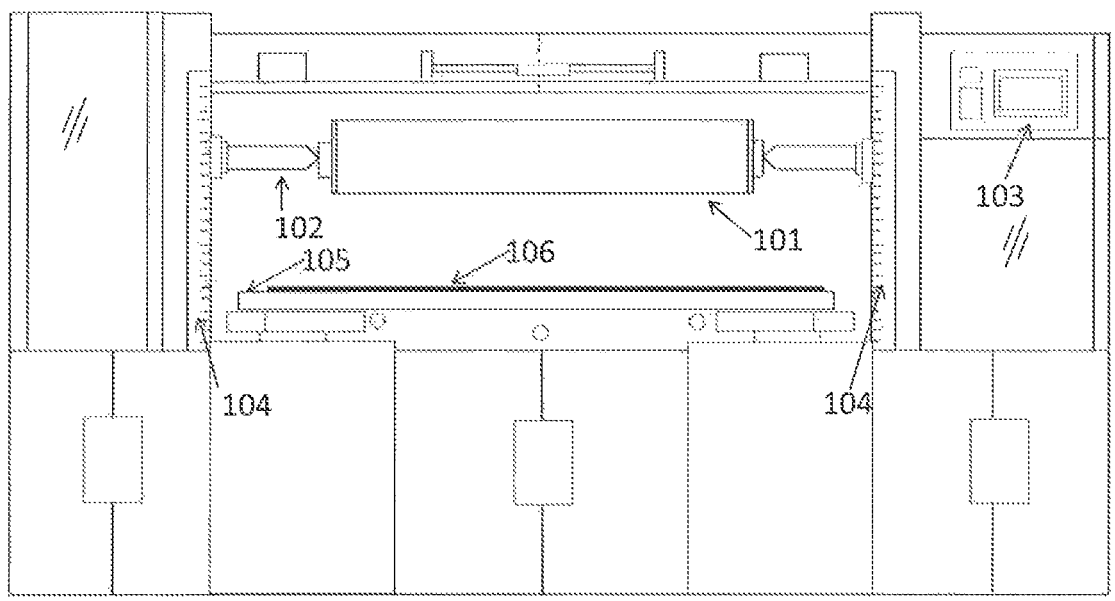
FIG. 1 is a structural schematic view of a cloth attaching device of a flat base type.

In order to make the object, technical solutions and advantages of the present disclosure more clearly, the technical solutions of the embodiments in the present disclosure are clearly and fully described. Apparently, the described embodiments are just a part but not all of the embodiments of the disclosure. Based on the described embodiments herein, those skilled in the art can obtain other embodiment (s), without any inventive work, which should be within the scope of the disclosure.

It is noted in the description of the present disclosure that the direction or position relationships indicated by the terms such as "up" and "down" are based on the directions or positions shown in the drawings, which are intended to describe the present disclosure for convenience and simplify the descriptions, but not to indicate or imply that the devices or elements must have specific orientations, or configured and operated in specific orientations, thus it is not understood as limitations of the present disclosure. Unless otherwise specified and defined, the terms "mount", "connected", "connecting" should be understood broadly, for example, a fixed connection, a detachable connection or an integral connection; or a mechanical connection or an electrical connection; or a direct connection, an indirect connection via an intermediate medium or a connection within two elements. Those skilled in the art can understand the specific meaning of the above-mentioned terms in the present disclosure in particular cases.

In order to illustrate the technical solutions of the present disclosure, a cloth attaching device of a flat base type is provided herein as a comparison of the present disclosure. FIG. 1 is a structural schematic view of a cloth attaching device of a flat base type. Referring to FIG. 1, the cloth attaching device comprises a body for support components in the entire device. The body is shown specifically as a cabinet in FIG. 1 and can comprise other mechanical support structures such as a bracket, a hanger, and the like, which the present disclosure is not limited thereto.

The cloth attaching device further comprises a rubbing roller 101 to be attached with a cloth, a clamp 102 for holding the rubbing roller 101, a position sensor for obtaining position information of the clamp 102, an operation panel 103 provided for user to control the cloth attaching device, a metal flat base 105 and a soft rubber pad 106 on the plat base 105. The soft rubber pad 106 serves mainly as a cushion for preventing the hard mechanical structure from being damaged and facilitating a double-sided adhesive tape or a rubbing cloth to be attached on the rubbing roller firmly and uniformly.

As an example of the mechanical configuration of the device, a cuboid recess space is formed from the top surface of the cabinet used as the body and runs across both front surface and back surface of the cabinet. A flat base 105 is fixed on the cabinet in a bottom portion of the cuboid space. A soft rubber pad 106 is provided on the flat base 105 without being fixed. Opposing homocentric square shaped guide rails 104 are provided on the two side surfaces of the cuboid space, respectively. A connecting shaft of the clamp 102 is provided between the guide rails and can slide along the rails. A position sensor is provided on the respective guide rail 104 for measuring the position of the clamp 102 with respect to the guide rail 104. A portal frame structure can be used to support the clamp 102 and provide the position sensor.

In order to perform the cloth attaching or adhesive applying process, the above-mentioned device further includes n actuating unit which is not shown in FIG. 1. The actuating unit is configured to control the movement of the clamp 102 according to the above position information, so that the rubbing roller 101 translates (e.g. sliding along the above-mentioned guide rail) or rotate about the connecting shaft of the clamp 102. The above-mentioned actuating unit can be implemented by devices including a motor (e.g. a servo motor, a frequency converted motor, and the like). The present disclosure is not limited thereto.

The above-mentioned cloth attaching device further includes a control unit (not shown in FIG. 1) for allowing user control of the process. The control unit is connected to the above-mentioned actuating unit, the operation panel 103, the position sensor, and so on, and configured to transfer a control signal to the actuating unit according to user instructions obtained from the operation panel 103 and signals input from the position sensor, so that the actuating unit controls the clamp 102 to move correspondingly. The above-mentioned control unit can be implemented by devices such as a microcontroller unit, a desktop computer, and the like. The present disclosure is not limited thereto.

Figure 2:
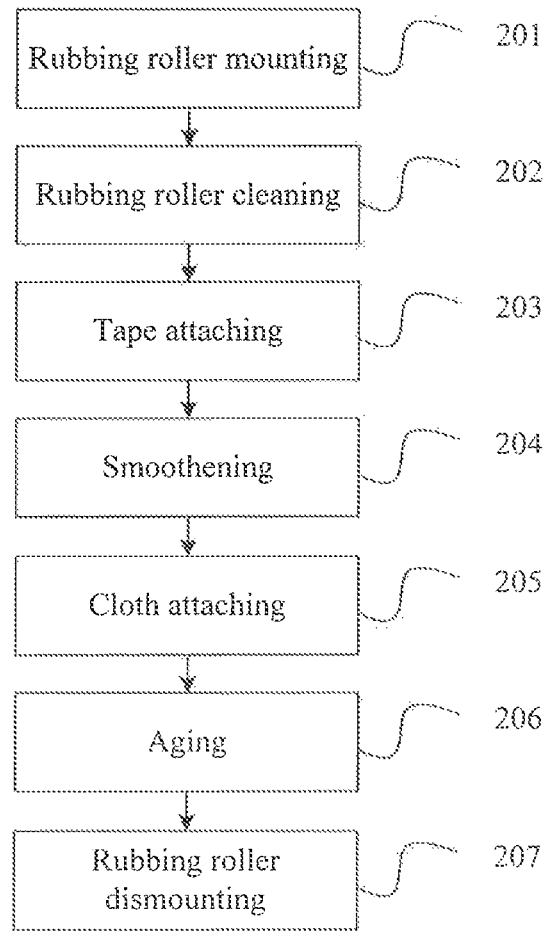
FIG. 2 is a flow chart showing a cloth attaching method according to an embodiment of the present disclosure.

In general, the above-mentioned cloth attaching device serves mainly for attaching a double-sided adhesive tape and a rubbing cloth on the surface of the rubbing roller 101 to fabricate the rubbing roller for the rubbing process. FIG. 2 is a flow chart showing a cloth attaching method according to an embodiment of the present disclosure. Referring to FIG. 2, the method comprises the following steps.

201. Rubbing roller mounting: the clamp 102 and the rubbing roller 101 to be attached with cloth are fixed with respect to each other, which could be realized simply and conveniently by providing a recess with a shape corresponding to the clamp 102 on the two end surfaces of the rubbing roller, respectively.

202. Rubbing roller cleaning: the rubbing roller 101 is cleaned such that the surface of the rubbing roller is smooth and shiny without contaminates.

203. Tape attaching: a layer of double-sided tape is spread on the soft rubber pad 106 on the flat base 105, and the double-sided tape is attached on the cylindrical surface of the rubbing roller 101 by rolling the rubbing roller 101 in a full circle on the double-sided tape through controlling the movement of the clamp 102.

204. Smoothening: by controlling the movement of the clamp 102, the rubbing roller 101 moves repeatedly in a way of "rolling from a first end to a second end on the flat base, raising, moving back to the first end in the air and dropping" for more than three times in general, so as to smooth the double-sided tape on the surface.

205. Cloth attaching: a layer of rubbing cloth with the cloth fiber extending downward is spread on the soft rubber pad 106 on the flat base 105, and the rubbing cloth is attached on the cylindrical surface of the side of the rubbing roller 101 by rolling the rubbing roller 101 in a full circle on the double-sided tape through controlling the movement of the clamp 102.

206. Aging: by controlling the movement of the clamp 102, the rubbing roller 101 moves repeatedly in a way of "rolling from a first end to a second end on the flat base, raising, moving back to the first end in the air and dropping" for more than three times in general, that is, the rubbing cloth attached on the rubbing roller 101 is rubbed in a same direction, so as to smooth the surface of the rubbing cloth and extend the fibers of the rubbing cloth in the rubbing direction.

207. Rubbing roller dismounting: the rubbing roller 101 is dismounted from the cloth attaching device after the cloth attaching process completes.

Aging process is referred to a process of attaching the rubbing cloth on the rubbing roller and rotating the rubbing roller under certain conditions to rub the rubbing cloth on a planar surface of an ITO glass or a common glass or other materials. The aging process is for extending cloth fibers of the rubbing cloth along the rubbing direction so as to maintain the uniformity of the cloth fibers and prevent quality problems such as rubbing issues.

Thus, the rubbing cloth is attached on the rubbing roller 101 and the cloth fibers thereon have a specific orientation, thus the cloth attaching process is completed using the above-mentioned cloth attaching device.

Since the soft rubber pad 106 of the above-mentioned cloth attaching device of flat base type is spread on the metal base without being fixed and the rubber pad is soft, during step 203 to step 206 in the above-mentioned process, the soft rubber pad 106 is somewhat displaced due to the rubbing force and stress, causing defects such as bubbles during tape attaching and cloth attaching process by the rubbing roller 101, thus resulting in wasting the double-sided tape and the rubbing cloth and increasing the manufacturing cost.

In addition, during the aging process of step 204 and step 206 in the above-mentioned process, because of the requirements on the orientation of the cloth fibers, the rubbing roller 101 can not roll back and forth on the flat base, instead can only roll clockwise or counter clockwise and repeat for many times; therefore the aging process is very time consuming, resulting in a low efficiency of the fabricating process, which in turn increases the manufacturing cost.

For addressing the above-mentioned issues, the present disclosure provides a cloth attaching device of a cylindrical base type. Referring to the structural schematic view of the cloth attaching device of a cylindrical base type shown in FIG. 3, the cloth attaching device comprises a cylindrical base 301 and an actuating unit (not shown). The cylindrical base 301 has a cylindrical surface covered by an annular adhesive layer 302 and two end surfaces held by a first connecting component 303. The first connecting component 303 is connected to the actuating unit. The actuating unit is further connected to a second connecting component 102 for holding the rubbing roller 101 from two end surfaces.

The actuating unit is configured for controlling the movement of the first connecting component 303 and the second connecting component 102, so as to rotate the rubbing roller 101 and the cylindrical base 301 in sync or not in sync.

Both the cylindrical base 301 and the rubbing roller 101 to be attached with cloth have a cylinder shape having two end surfaces and one cylindrical surface and are held from two ends by the first connecting component 303 and the second connecting component 102, respectively. The first connecting component 303 and the second connecting component 102 each can be a clamp positioned at two ends of the cylinder, or a bearing running across the cylinder, or other components having the same connecting functionality. The present disclosure is not limited thereto. Preferably, the clamp is used for the first connecting component 303 and/or the second connecting component 102, and a recess with a shape corresponding to the clamp is provided on the two end surfaces of the cylindrical base 301 and/or the rubbing roller 101, respectively, so as to achieve a more stable connection.

In addition, the cloth attaching device further includes a body providing support for the components in the entire device. In particular, the body can be a cabinet shown in FIG. 3 and can comprise other mechanical support structures such as a bracket, a hanger, and the like. Based on the exemplary mechanical structures of the above-mentioned cloth attaching device of the flat base type, the guide rails can be modified to a shape in a way that the first connecting component 303 and the second connecting component 102 can slide on the guide rails, or a portal frame is used to support both the first connecting component 303 and the second connecting component 102, or other equivalent support structures. The present disclosure is not limited thereto.

The actuating unit is connected to the above-mentioned first connecting component 303 and second connecting component 102 so as to control the movement of the two connecting components to move the rubbing roller 101 and the cylindrical base 301. In particular, the actuating unit can include a motor (e.g. a servo motor, a frequency converted motor, and the like). The present disclosure is not limited thereto.

Particularly, in a case that the cylindrical surfaces of the cylindrical base 301 and the rubbing roller 101 to be attached with cloth are arranged on top of each other and tangential to each other with interchangeable position, the cylindrical base 301 and the rubbing roller 101 to be attached with the cloth can rotate reversely in sync with the cylindrical surfaces thereof tangential to each other by controlling the first connecting component 303 and the second connecting component 102 to rotate in sync through the actuating unit. At this time, one end of the double-sided tape or the rubbing cloth is positioned on the cylindrical surface of the cylindrical base 301, thus the double-sided tape or the rubbing cloth can be attached on the cylindrical surface of the rubbing roller 101 along with the rotation. Similarly, in the smoothening process or aging process, by using the synchronous reverse rotation and maintaining a certain pressure between the cylindrical base 301 and rubbing roller 101, the surface of the double-sided tape or the rubbing cloth can be smoothened and the fibers of the rubbing cloth can be rubbed and extend along the rubbing direction along with the rotation so as to have a specific orientation.

Since the flat base is replaced by the cylindrical base 301 in the above-mentioned cloth attaching device of the cylindrical base type, the rubber pad can be firmly fixed on the cylindrical base due to the elasticity of the rubber pad. Thus, the defect in which the rubber pad displaces very easily can be overcome, thus avoiding the corresponding issues related to the defect and enhancing the fabricating quality of the rubbing roller.

Moreover, with the cylindrical base 301, the smoothening process or the aging process can be achieved by way of rotating the rubbing roller and the cylindrical base reversely in sync, therefore the rubbing roller does not move back-and-forth, which is very time consuming, during the smoothening process or the aging process. Thus, the smoothening process or the aging process is simplified and the fabricating efficiency is increased.

Alternatively, the attaching, smoothening and aging process can be performed by rotating the cylindrical base 301 and the rubbing roller 101 no in sync. The present disclosure is not limited thereto.

Figure 4:
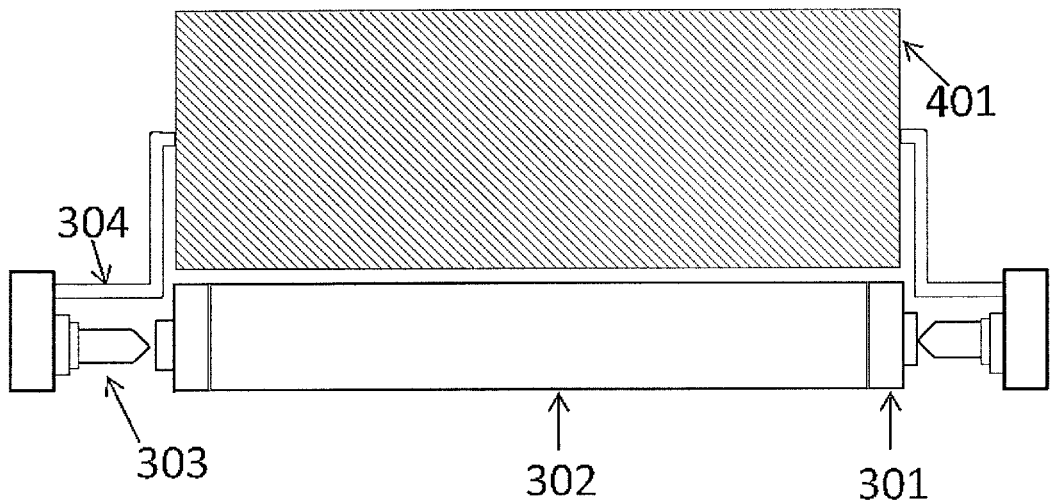
FIG. 4 is a top view of a cloth attaching device of a cylindrical base type according to an embodiment of the present disclosure.

FIG. 4 is a top view of the cloth attaching device of the cylindrical base type. Referring to FIG. 4, the cloth attaching device optionally further includes a flat base 401 supporting the double-sided tape or the rubbing cloth. The flat base has a surface tangential to the cylindrical surface of the cylindrical base. Herein, the flat base 401 is configured for spreading the double-sided tape or the rubbing cloth to be positioned between the cylindrical base 301 and the rubbing roller 101, and is preferably supported by a support frame 304 shown in FIG. 4. Other mechanical structures can also be used as the support structure of the double-sided tape or the rubbing cloth.

Figure 3:
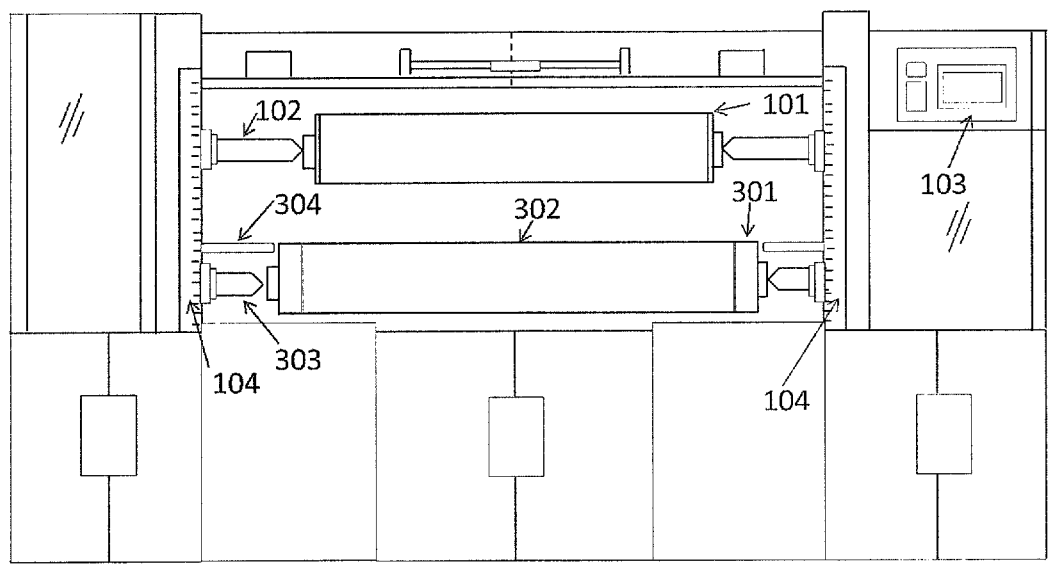
FIG. 3 is a structural schematic view of a cloth attaching device of a cylindrical base type according to an embodiment of the present disclosure.

Referring to FIG. 3, the above-mentioned first connecting component and second connecting component can be optionally provided on the same support structure. Herein the support structure can include a portal frame provided on the rails and other structures having equivalent functionalities. With the cylindrical base 301, it is unnecessary to translate the rubbing roller 101 along the flat base 105. Instead, it is simply need to set up a support structure in a vertical direction so that the cylindrical base 301 and the rubbing roller 101 can move up and down in parallel. Thus, the process is simplified and the space taken by the entire device is decreased.

Optionally, a position sensor is provided on the above-mentioned support structure to obtain the position information of the first connecting component 303 and the second connecting component 102, which is a position information of the above-mentioned support structure in this case. The position sensor can include at least one of infrared ray sensors connected with multiplexers and positioned at different locations of the support structure, or laser distance measuring sensors provided along the moving direction of the connecting components. The present disclosure is not limited thereto. The above-mentioned position sensor 102 is connected to the above-mentioned actuating unit for outputting a sensing signal including the position information to the actuating unit. In this way, the actuating unit can control the movement of the first connecting component 303 and the second connecting component 102 based on the received sensing signal, so that the rubbing roller 101 and/or the cylindrical base 301 move in parallel or rotate in any ways such as in sync or not in sync; clockwise or counter clockwise. The first connecting component 303 and the second connecting component 102 can move either independent with respect to each other, or in sync or not in sync but with a prescribed mode.

In addition, with respect to the operation panel 103 and the control unit not shown in FIG. 3, the control unit is connected to the actuating unit, operation panel 103 and position sensor, so that a control signal is sent to the actuating unit based on user instructions obtained from the operation panel 103 and the signal input from the position sensor, so as to enable the actuating unit to control the clamp 102 to perform the corresponding movement. The above-mentioned control unit can include a micro controller unit, a desktop computer, and the like. The present disclosure is not limited thereto.

The cloth attaching device further includes an annular adhesive layer 302 covering the cylindrical surface of the cylindrical base 301 to be positioned between the doubled-sided tape to be attached and the cylindrical base 301. The annular adhesive layer 302 is made of soft and elastic materials for rubbing the rubbing cloth, such as soft rubber. Moreover, in order to achieve the functionality of the annular adhesive layer 302, the annular adhesive layer 302 has a length on the cylindrical surface of the cylindrical base 301 greater than that of the rubbing roller 101. Herein, since the material made of the annular adhesive layer 302 is elastic, the annular adhesive layer 302 can be firmly attached on the cylindrical base 301 so as to avoid the case in which the soft rubber pad displaces and causes corresponding issues.

Optionally, the cylindrical surface of the above-mentioned cylindrical base 301 includes a recess, within which the annular adhesive layer 302 is embedded. After the annular adhesive layer 302, such as the soft rubber pad, is embedded in the recess, the surface of the annular adhesive layer 302 preferably flushes with the respective end surface of the cylindrical base 301.

In most cases, the above components of the above-mentioned cloth attaching device can be made of metal or plastic materials. The present disclosure is not limited thereto.

Figure 5:
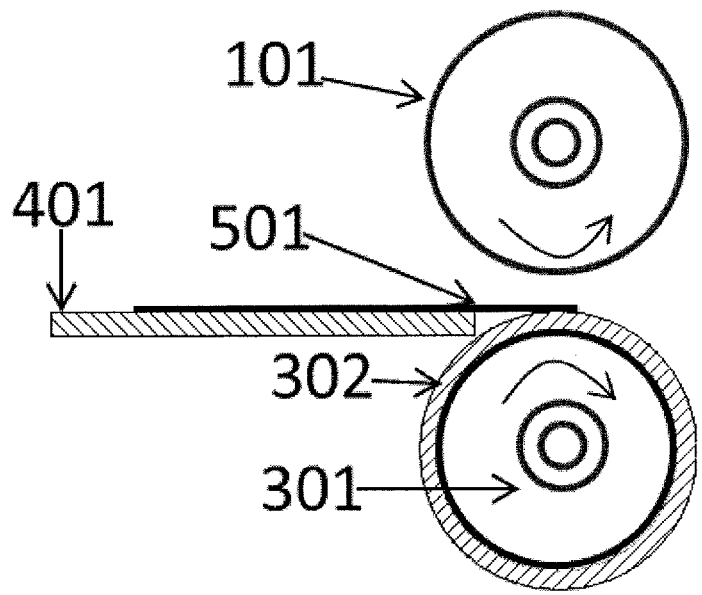
FIG. 5 is a side view of a cloth attaching device of a cylindrical base type according to an embodiment of the present disclosure.
Figure 6:
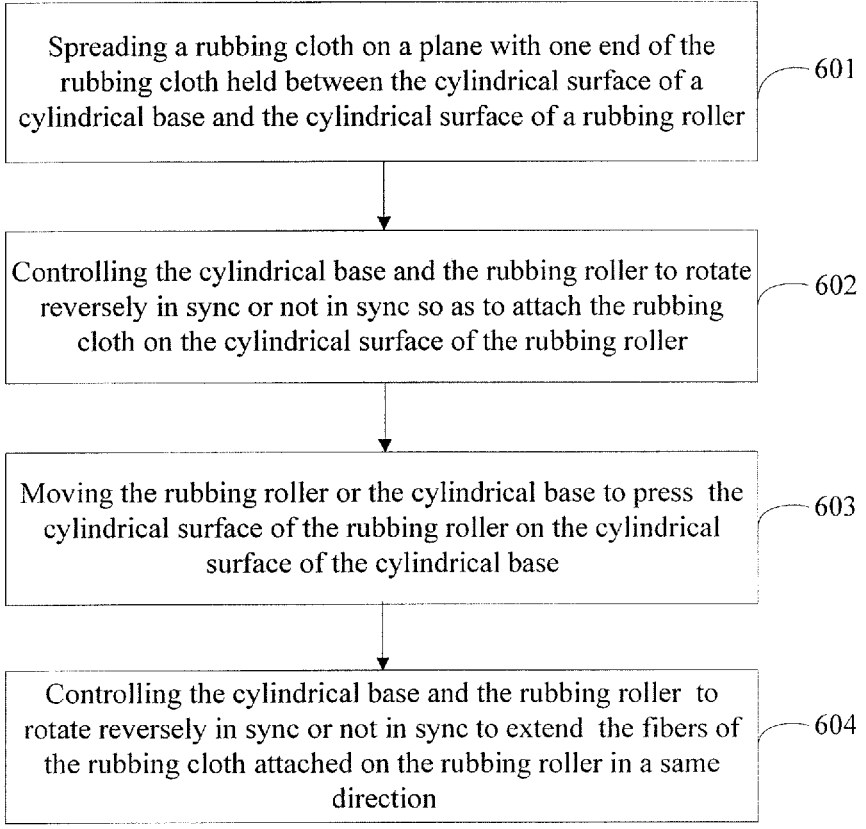
FIG. 6 is a flow chart showing an attaching step in a cloth attaching method according to an embodiment of the present disclosure.

In particular, a cloth attaching process using the above-mentioned cloth attaching device will be described as below with reference to FIG. 5 and FIG. 6. FIG. 5 is a side view of a cloth attaching device of a cylindrical base type according to an embodiment of the present disclosure, and FIG. 6 is a flow chart showing an attaching step in a cloth attaching method according to an embodiment of the present disclosure. The cloth attaching method comprises the following steps.

601. A rubbing cloth is spread on a plane with one end of the rubbing cloth held between the cylindrical surface of a cylindrical base and the cylindrical surface of a rubbing roller. The cylindrical surface of the cylindrical base is covered by an annular adhesive layer.

602. The cylindrical base and the rubbing roller are controlled to rotate reversely in sync or not in sync so as to attach the rubbing cloth on the cylindrical surface of the rubbing roller.

In case that the two sides of the rubbing cloth are a front side with cloth fibers and a back side without cloth fibers, the front side of the rubbing cloth face towards the cylindrical base at step 601.

Before step 601, an adhesive layer for attaching the rubbing roller and the rubbing cloth is provided on either the cylindrical surface of the rubbing roller or the back side of the rubbing cloth. That is, the method may include a following step of providing an adhesive layer for attaching the rubbing roller and the rubbing cloth on either the cylindrical surface of the rubbing roller or one side of the rubbing cloth.

An example of providing the adhesive layer with a double-sided tape as the adhesive layer is set forth as below. Firstly a double-sided tape is spread on a plane with one end of the double-sided tape held between the cylindrical surface of the cylindrical base and the cylindrical surface of the rubbing roller, keeping the spacer layer on one side of the double-sided tape in contact with the plane while removing the spacer layer on the other side. The side with the spacer layer faces the cylindrical surface of the cylindrical base. Then the cylindrical base and the rubbing roller are controlled to rotate reversely in sync or not in sync so as to attach the double-sided tape on the cylindrical surface of the rubbing roller. After attaching the double-sided tape, the rubbing roller or the cylindrical base is moved so that the cylindrical surface of the rubbing roller is pressed on the cylindrical surface of the cylindrical base, while the cylindrical base and the rubbing roller are controlled to rotate reversely in sync or not in sync to attach the double-sided tape on the cylindrical surface of the rubbing roller smoothly. Finally the spacer layer on the outer side of the double-sided tape is removed so as to continue the cloth attaching operation of step 601. The process can be also described as below.

A spacer layer on a first side of the double-sided tape is removed. The double-sided tape is spread on a plane with the first side facing upwards with the one end of the double-sided tape held between the cylindrical surface of the cylindrical base and the cylindrical surface of the rubbing roller, the first side of the double-sided tape facing the rubbing roller. The cylindrical base and the rubbing roller are controlled to rotate reversely in sync or not in sync to attach the double-sided tape on the cylindrical surface of the rubbing roller. A spacer layer on a second side of the double-sided tape is removed.

The rubbing cloth can be firmly attached on the rubbing roller using the double-sided tape, and the above tape attaching process is compatible with the above cloth attaching device, thus it is simple and easy to apply with low cost. The method of forming the adhesive layer is not limited to the above-mentioned embodiment.

It is seen in the above embodiment where the double-sided tape is used as the adhesive layer, the double-sided tape and the rubbing cloth are attached successively. The attaching process can be described as below. Referring to FIG. 5, a double-sided tape 501 or a rubbing cloth 501 is spread on a planar base 401 and a cylindrical base 301, with one end of the double-sided tape 501 or the rubbing cloth 501 held between an annular adhesive layer 302 on the cylindrical base 301 and a rubbing roller 101. When the rubbing roller 101 is rotated in a counter clockwise direction, and the cylindrical base 301 is rotated in a clockwise direction in sync with the rubbing roller 101, the double-sided tape or the rubbing cloth 501 is rolled and attached on the cylindrical surface of the rubbing roller 101. Compared with step 203 and step 205 in the method of cloth attaching using the cloth attaching device of the flat base type, since the annular adhesive layer 302 can be firmly attached on the cylindrical surface of the cylindrical base 301, the method of cloth attaching herein does not have a problem in which the soft rubber pad displaces and cause the corresponding issue.

Moreover, after step 602, the method can further include an aging step for the rubbing cloth as below.

603. The rubbing roller or the cylindrical base is moved so that the cylindrical surface of the rubbing roller is pressed on the cylindrical surface of the cylindrical base.

604. The cylindrical base and the rubbing roller are controlled to rotate reversely in sync or not in sync so that the fibers of the rubbing cloth attached on the rubbing roller extend in a same direction.

Since the cylindrical surface of the cylindrical base is covered by the annular adhesive layer, the annular adhesive layer can be used as a material for rubbing the rubbing cloth. Specifically, the cylindrical base and the rubbing roller can be rotated reversely with a speed difference such that the annular adhesive layer can rub the rubbing cloth to extend the fibers of the rubbing cloth in a same rubbing direction.

In the above-mentioned embodiment where the double-sided tape is used as the adhesive layer, a smoothening process for the attached adhesive layer can be further performed. In comparison to the foregoing cloth attaching method using the cloth attaching device of the plat base type, the smoothening process herein can be described as below.

The rubbing roller or the cylindrical base are moved so that the cylindrical surface of the rubbing roller is pressed on the cylindrical surface of the cylindrical base; and the cylindrical base and the rubbing roller are controlled to rotate reversely in sync or not in sync to attach the double-sided tape on the cylindrical surface of the cylindrical base.

Referring to FIG. 5, in case of a smoothening or aging process for a double-sided tape 501 or a rubbing cloth 501 attached on a rubbing roller 101, it is only required to keep the rubbing roller 101 against the cylindrical base 301 with a certain pressure and then rotate the rubbing roller 101 and the cylindrical base 301 reversely in sync in order to obtain the smoothening or aging effect.

Compared with step 204 and step 206 in the cloth attaching method using the cloth attaching device of the flat base type, in the smoothening or aging process herein, it is not necessary to move the rubbing roller back and forth, instead, it only requires the rubbing roller 101 and the cylindrical base 301 to rotate for a certain revolutions to achieve the aging effect. In this case, the rubbing roller does not move back-and-forth in the aging process, which is very time consuming. Therefore the aging process is simplified and the fabricating efficiency is enhanced.

To sum up, the present disclosure provides a cloth attaching device and a cloth attaching method. A cylindrical base is used to replace the conventional flat base in the cloth attaching device of the present disclosure. In this case, the rubber pad can be firmly fixed on the cylindrical base due to the elasticity of the rubber pad. Thus, the prior art defect in which the rubber pad displaces very easily is overcome and the corresponding issue resulting from the defect is avoided so as to enhance the fabricating quality of the rubbing roller.

Moreover, since the cylindrical base is used, the aging process can be achieved by rotating the rubbing roller and the cylindrical reversely in sync. The rubbing roller does not perform a back-and-forth movement in the aging process, which is very time consuming. Thus, the aging process is simplified and the fabricating efficiency is enhanced.

Therefore, the present disclosure overcomes the defects in which the rubber pad displaces very easily and the aging process is very time consuming, thus enhancing the fabricating efficiency and quality of the rubbing roller.

It is understood that relative terms such as "first" and "second" herein are only intended to distinguish one object or operation from another, but not to require or imply that there is any substantial relationship or order between these objects or operations. Moreover, the terms "comprise", "include" or any other variations are intended to cover nonexclusive inclusion such that the a process, a method, an object or a device including a plurality of elements includes not only these elements, but also other elements not listed explicitly or inherent elements included in the process, method, object or device. In the case of additional limitations, the elements defined by "include a . . . " do not exclude other identical elements included in the process, method, object or device.

The above-mentioned embodiments are only used to describe the technical solutions of the present disclosure and not limitative of the disclosure. While the present disclosure is described in details referring to the foregoing embodiments, it is understood for those skilled in the art that they can modify the technical solutions in the foregoing embodiments or equivalently substitute some of the technical features. These modifications or substitutions do not departure the essence of corresponding technical solutions from the spirit and scope of the technical solutions of respective embodiments in the present disclosure.

What is claimed is:

1. A cloth attaching device comprising:
    a cylindrical base, a rubbing roller opposing the cylindrical base, and an actuating unit,
    an annular adhesive layer covering a cylindrical surface of the cylindrical base;
    a first connecting component holding both ends of the cylindrical base and connecting to the actuating unit; and
    a second connecting component holding both ends of the rubbing roller and connecting to the actuating unit;
    wherein the actuating unit is configured to control a movement of the first connecting component and the second connecting component so that the rubbing roller and the cylindrical base rotate in sync or not in sync.

2. The cloth attaching device of claim 1, wherein the cloth attaching device further comprises:
    a flat base for supporting a double-sided tape or a rubbing cloth, the flat base having a surface tangential to the cylindrical surface of the cylindrical base.

3. The cloth attaching device of claim 1, wherein the first connecting component comprises a clamp corresponding to a slot formed on an end surface of the cylindrical base.

4. The cloth attaching device of claim 1, wherein the cloth attaching device further comprises a position sensor for obtaining a position information of the first connecting component and the second connecting component.

5. The cloth attaching device of claim 4, wherein the position sensor is connected to the actuating unit for outputting a sensing signal including the position information to the actuating unit;
    the actuating unit is further configured to control the movement of the first connecting component and the second connecting component according to the input signal of the sensor.

6. The cloth attaching device of claim 1, wherein the annular adhesive layer has a length on the cylindrical surface of the cylindrical base greater than a length of the rubbing roller.

7. The cloth attaching device of claim 2, wherein the annular adhesive layer has a length on the cylindrical surface of the cylindrical base greater than a length of the rubbing roller.

8. The cloth attaching device of claim 3, wherein the annular adhesive layer has a length on the cylindrical surface of the cylindrical base greater than a length of the rubbing roller.

9. The cloth attaching device of claim 4, wherein the annular adhesive layer has a length on the cylindrical surface of the cylindrical base greater than a length of the rubbing roller.

10. The cloth attaching device of claim 5, wherein the annular adhesive layer has a length on the cylindrical surface of the cylindrical base greater than a length of the rubbing roller.

11. The cloth attaching device of claim 1, wherein the annular adhesive layer is made of soft rubber.

12. The cloth attaching device of claim 11, wherein the cylindrical base comprises a recess on the cylindrical surface and the annular adhesive layer is embedded within the recess.

* * * * *